March 30, 1948.  A. R. OBERWEGNER  2,438,644
TURRET TOOL POST
Filed Aug. 18, 1943   2 Sheets-Sheet 1

INVENTOR.
ALFRED R. OBERWEGNER.
BY William B. Hall
ATTORNEY.

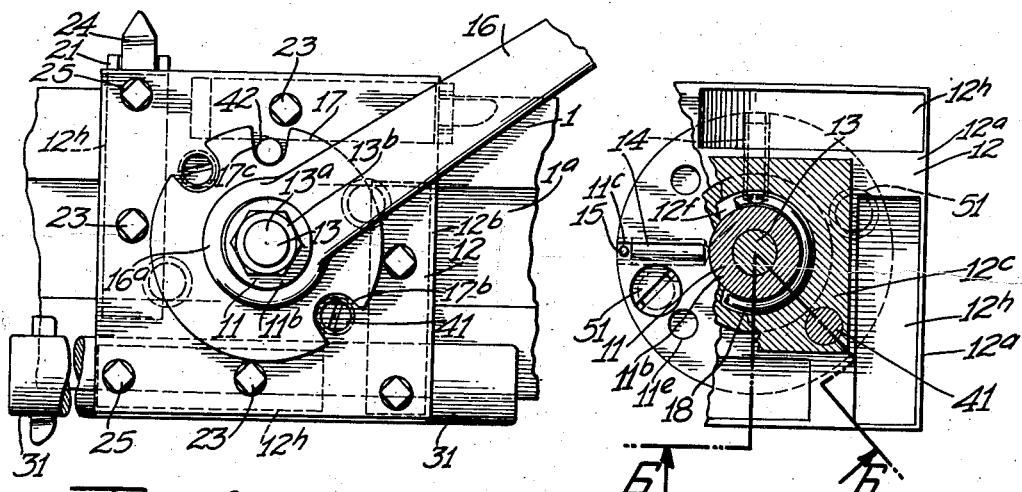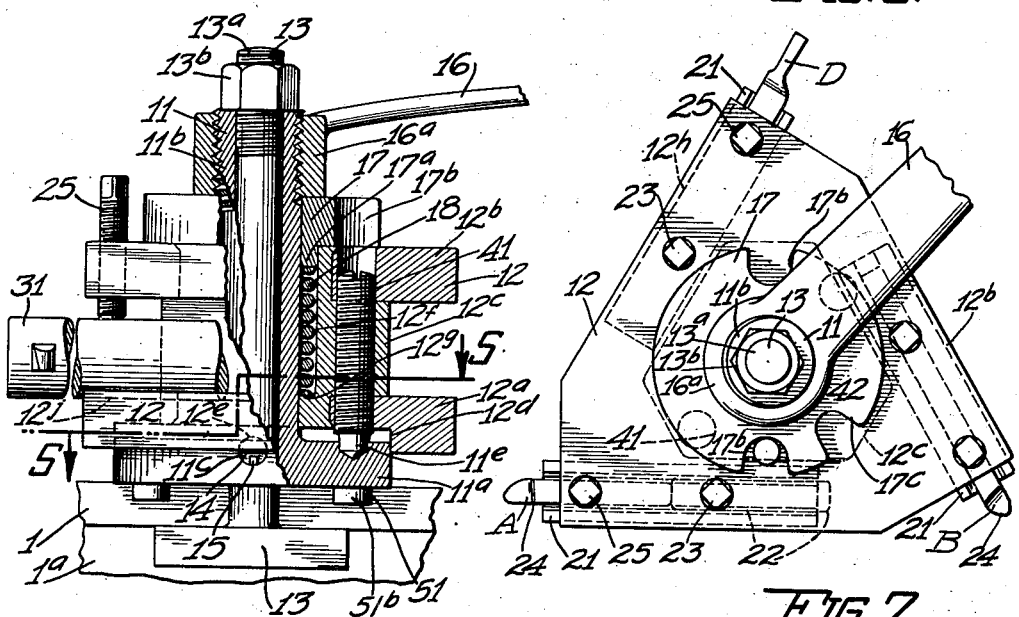

Patented Mar. 30, 1948

2,438,644

UNITED STATES PATENT OFFICE 2,438,644

TURRET TOOL POST

Alfred R. Oberwegner, Los Angeles, Calif.

Application August 18, 1943, Serial No. 499,098

6 Claims. (Cl. 29—48)

My present invention relates to a tool holding means, and more particularly to a turret tool holding means which may be applied to and used on a lathe, or other cutting machine, for performing various operations.

One of the principal objects of this invention is to provide a turret tool-holding means for holding a plurality of cutting or other tools on a conventional lathe carriage, or corresponding part of other conventional machine, whereby the various tools on the tool-holding means may be readily shifted into position for use, and a tool holding means of this class in which the individual tools may be quickly adjusted, and in which the tools may be held tightly in position with a minimum of mechanism, apparatus, and effort.

Another important object of this invention is to provide a tool holding means in which the cutting, or other operating tool, may not be accidentally or readily shifted in a lateral direction or undesired position during the cutting or other operation.

Another important object of this invention is to provide simple means for tightly holding cutting or other tools of different sizes, such as cutting tools of varying cross-sections.

An important object also of this invention is to provide a tool holding means of this class in which a stop may be secured in any desired position so that a cutting tool may be readily removed from the tool holding means, and sharpened or adjusted, and replaced to its original position without the expenditure of unnecessary time to make adjustments.

A further important object of this invention is to provide a turret or turn table on a support in which the locating or indexing means consists of a plurality of radiating rollers for accurately indexing the former with respect to the latter, for obtaining greater accuracy, and without any appreciable wear on the members, and means in connection therewith for resiliently holding the tools in their shifted positions and for causing the shifted positions of the tool holding means to be determined by a substantial snapping of the means into such positions.

Another important object of this invention is to provide a tool holder of this class which may be used effectively for holding either small or relatively large boring bars.

Also an important object of this invention is to provide a novel means in connection with a tool holder of this class for vertically adjusting the boring bar or other tool held by the tool holding means.

A still further object of this invention is to provide novel and simple means of anchoring the tool post against turning on the saddle of the lathe or similar tool supporting carriage, and such means which may be easily shifted into position for use or out of the way.

With these and other objects in view, as will appear hereinafter, I have devised a turret tool post having certain novel features of construction, combination, and arrangements of parts and portions, as will be hereinafter described in detail and particularly set forth in the appended claims, reference being had to the accompanying drawings and to the characters of reference thereon which form a part of this application, in which:

Fig. 4 is a fragmentary plan view, similar to that shown in Fig. 1, but showing a boring bar held by the holding means and also showing a protective collar at the upper portion of the holding means, shifted to a slight angular position to expose means for vertically adjusting the tools;

Fig. 5 is a fragmentary sectional view thereof in plan, taken through 5—5 of Fig. 6;

Fig. 6 is an elevational view of the tool holder showing the same holding a boring bar and also showing in section the means for vertically adjusting the boring bar or other tool, the sectional portion being shown as taken through 6—6 of Fig. 5; and Fig. 7 is a plan view of a slightly modified form of construction of my tool holding means.

Figure 1:
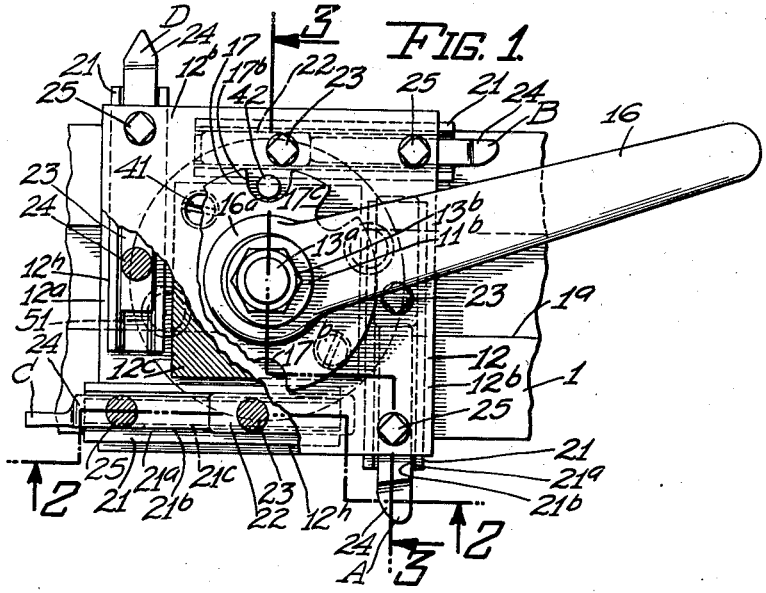
Fig. 1 is a fragmentary plan view of the tool carriage showing my tool holding means in one form, mounted thereon, portions being shown broken away and in section, the broken away and sectional portions being taken approximately at 1—1 of Fig. 2.

The numeral 1 designates the saddle of a tool supporting and adjusting carriage, which is normally provided on lathes, shapers, and the like. This carriage usually is provided with a T-slot, designated 1ª, for receiving a T-bolt whereby the tool post or other tool holding means is secured to the carriage.

The essential tool supporting elements of my tool holding means consist of a base or support 11 and a tool holder 12 carried on or by the base. The support 11 has a disc-shaped base portion 11ª, which rests upon the carriage 1, and a cylindrical column or post 11ᵇ, extending upwardly from and coaxial with respect to the base. The support 11 is secured to the carriage by the T-bolts 13, the head of which is located in the T-slot 1ª. The shank 13ª of the bolt extends coaxially through the column 11ᵇ, and is provided at its upper threaded end with a nut 13ᵇ which bears against the upper end of the column holding the device in position on the saddle.

The tool holder 12 is made in the form of a spool and consists of a lower flange member 12ª, an upper flange member 12ᵇ, and a tubular spacer 12ᶜ. The intermediate portion of this spacer is of square cross-section and the ends are reduced, said ends extending into holes in the flanges and are peened over, securing the several members 12ª, 12ᵇ, and 12ᶜ rigidly together. The flange members 12ª and 12ᵇ are centrally located by the cylindrical column 11ᵇ which extends axially through the spacer. The under side of the lower flange member 12ª is also provided with a counter-sunk recess 12ᵈ for receiving the base portion 11ª of the support, as shown best in Fig. 3, and thereby further centrally locating the tool holder 12 on the support 11.

Figures 2, 3:
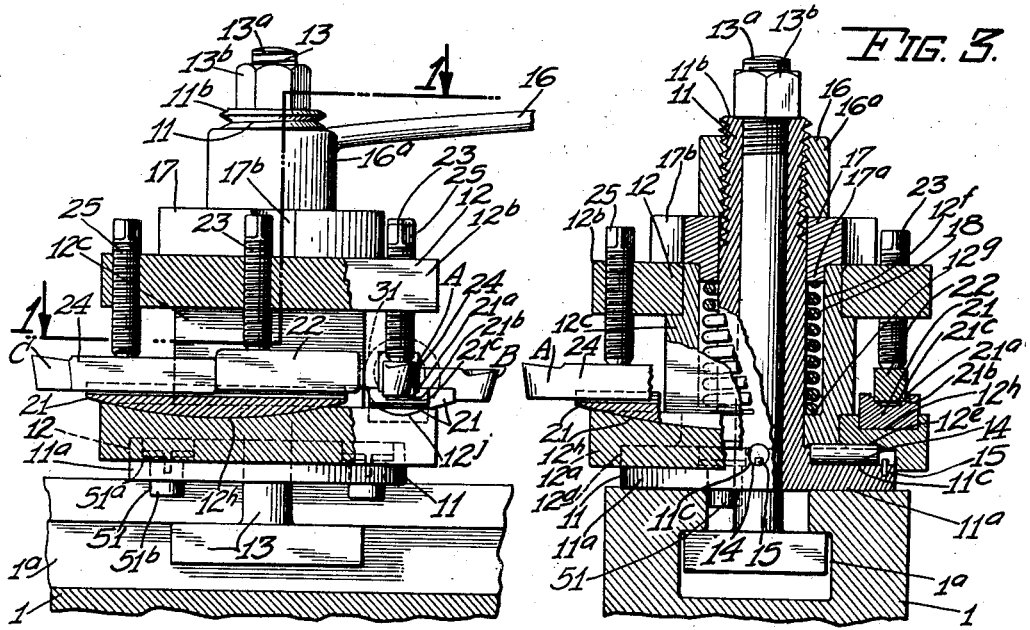
Fig. 2 is a partial sectional and partial elevational view thereof, with the section and view taken at 2—2 of Fig. 1.
Fig. 3 is a sectional elevational view thereof, taken substantially through 3—3 of Fig. 1.

The tool holder 12 is circumferentially positioned or indexed with respect to the base or support 11 by a suitable roller means. This term is employed to designate balls, rollers, or the like. In this instance, I have employed roller means to perform specific functions, and as consisting of a plurality of radiating rollers 14 located between the disc-shaped base portion 11ª, of the support 11, and the lower flange member 12ª. The rollers 14 are inserted endwise into radiating holes 11ᶜ in the disc shaped base portion 11ª, with only a portion of the rollers extending above the base portion, as shown in Fig. 3. These rollers may be held in position by pins 15. The portions of the rollers extending above the base portion are adapted to be seated in radiating grooves 12ᵉ at the underside of the lower flange member 12ª. The portions of the underside of this flange member, between the radiating grooves 12ᵉ, are adapted to ride upon the rollers, but this flange member drops over the rollers when the grooves 11ᶜ are opposite the latter, thereby fixing the tool holder 12 circumferentially with respect to the base or support 11.

The tool holder 12 is secured with respect to the base by a lever 16 having a threaded hub or nut 16ª which is screwed over the upper threaded end of the column 11ᵇ. Between the upper face of the upper flange 12ᵇ and the hub or nut 16ª is located a collar 17 having a reduced hub 17ª which extends into the upper end of a central bore 12ᶠ of the spacer 12ᶜ. This bore has a shoulder 12ᵍ at its lower end, which shoulder is provided at the upper side of the portion locating the tool holder around the column. This bore forms a cylindrical recess for a coil spring 18, the ends of which engage the shoulder 12ᵍ and the inner end of the hub 17ª.

As the lever 16 is unscrewed, the spring 18, under compression, raises the collar 17 against the nut 16ª, permitting the tool holder 12 to be raised when it is desired to rotate the tool holder with respect to the base or support, thereby permitting the tool in the tool holder to be shifted circumferentially to its desired position. The tool holder is then secured in the desired shifted position by screwing the lever 16 down on the column 11ᵇ.

Various cutting tools, indicated by the letters A, B, C, and D, for performing various operations on the work on the particular machine, are mounted on the tool holder between the flange members 12ª and 12ᵇ, and more specifically on the upper face of the flange member 12ª. The latter flange member is provided in its upper face with a plurality of rocker grooves 12ʰ which are located near the corners of the flange member 12ª. These grooves are arranged substantially tangentially with respect to a circle concentric with the pivotal axis of the tool supporting holder. The long side of each groove is spaced inwardly from one edge of the lower flange member and the end of the particular groove is spaced from the adjacent edge of the flange member, as shown best in Fig. 1. The bottom of the groove is arcuate, as shown best in Fig. 2. Each of these grooves is adapted to receive a tool-supporting wedge 21, which is adapted to rock in the groove so that its upper or tool supporting face may be variously inclined with the face of the flange member 12ª for angularly adjusting the tool with respect to the tool holder and thereby raising or lowering the cutting nose of the tool.

The upper portion or face of the rocker tool supporting wedge has a longitudinal channel 21ª, the opposite sides of which consist of a plurality of parallel steps 21ᵇ and these form with each other a plurality of grooves, one within the other, one groove being cut substantially within the floor of the next larger groove, as shown best in Fig. 2 of the drawings. These grooves of various widths are adapted to receive cutting tools, or other members, of corresponding width, thus providing narrow grooves or seats for tools of various widths.

In the drawings, I have shown stops 22 at one end of the channels 21ª of the tool receiving and supporting wedges; and I have shown these wedges as secured in position by set screws 23 which are screwably mounted in the upper flange member 12ᵇ. I have shown the cutting members, designated 24, as also positioned in the channels 21ª but at the outer ends thereof and with the inner ends of the tool abutting the ends of the stops 22. The tools 24 are similarly secured in position by set screws 25, also carried by and extending through the upper flange member 12ᵇ. The stops 22 and the cutting tool 24 may be of different cross-sections, but both may be seated securely by reason of the multi-grooved faces in the wedges 21.

Such construction of the tool holding means, permits the wedge and the stop to be secured in a fixed position, and permits the cutting tools 24 to be removed, sharpened, and replaced in the same position as before the sharpening, with only a slight adjustment of the cutting tool if necessary.

My tool holder is so constructed that a small boring bar may be effectively located and held by one of the tool supporting wedges 21. If it is desired, however, to hold a large boring bar with my tool holder, a tool supporting wedge is removed and the boring bar located in the same position, as indicated by 31 in Fig. 6. In order properly to seat the boring bar, the top or face of the lower flange 12ª of the flange member 12 is provided with an appropriate locating recess 12ʲ. As shown in Fig. 2, this locating recess is shown astride and in alignment with a rocker groove 12ʰ. The boring bar may be held in position by the set screws 23 and 25.

A boring bar, as well as certain other tools, may be often required to be adjusted vertically. To effect such result, I have provided a pair of adjusting screws 41 which are positioned diametrically opposite each other about the axis of the tool holder 12, these adjusting screws extending through the tool holder preferably at and through the corner portions of the square part 12c of the spacer 12, as shown best in Fig. 5.

The heads of the screws are short of the upper side of the upper flange member, and the lower ends thereof are adapted to extend below the lower flange member and into conforming recesses 11e at the upper side of the base portion of the support 11, as shown best in Figs. 5 and 6. It will be noted that the recesses 11e are staggered with respect to the radiating roller grooves 11c. When it is not desired to adjust the tool 31 vertically with respect to the base, the upper ends of the holes for the adjusting screws 41 are covered by means of the collar 17; but when it is desired to adjust the screws 41, the collar 17 is rotated until holes or two diametrically opposed notches 17b at the periphery of the collar 17 are brought into alignment with the screws 41 so that the latter may be readily adjusted. When it is intended to cover the upper ends of the holes for the adjusting screws 41, the collar is so shifted circumferentially that one of the notches 17b is located over a pin 42, thereby locking the collar against rotation. When it is desired to place the notches 17b opposite the screws 41, another notch 17c in the collar 17 permits the latter to be lowered over the pin 42. When the tool holder is adjusted to the desired vertical position, it is secured in place by the lever 16.

The tool post normally rests directly on the flat top face of the saddle 1 of the lathe or other machine carriage, and is secured thereagainst by a single bolt, such as the T-bolt 13 shown in the drawings. I have provided additional means to absorb the shifting or twisting tendency of the tool post. Such means consists of a pair of stops 51 having flat heads 51a and shanks 51b. These are mounted in the disc shaped portions 11a of the support 11 and the overall length of the stops is preferably slightly less than the base 11a. The head portions 51a and the upper portions of the shanks 51b are longitudinally split as indicated by 51c. The head portions of the stops thereby become expansible and frictionally secure the stops either in their downwardly shifted stop positions or in upwardly retracted positions. When shifted downwardly, the protruding shanks engage the upper sides of the T-slots 1a, as indicated in Figs. 1, 3, and 4. The pins or stops 51 may be retracted by manually forcing the same upwardly from below.

In Fig. 7 of the drawings, I have shown a tool holder having a triangular shape in plan. This particular shape permits greater clearance at both sides of the cutting or other tool so that it will not interfere with the work, to be operated on, on the lathe or other machine. This tool holder may be used to provide access to portions of the work not permitted by the other structure described.

Though I have shown and described a particular construction, combination, and arrangement of parts and portions, and certain modifications thereof, I do not wish to be limited to the same but desire to include in the scope of my invention the construction, combination, and arrangement substantially as set forth in the appended claims.

I claim:

1. In a means of the class described, a support, a turntable mounted on said support and provided with a face adjacent the support, a plurality of positioning rollers located between the support and the turntable, each of the latter being provided with circumferentially spaced radiating index notches for receiving the rollers, screw means for securing the turntable with respect to the support, and a spring for resiliently holding the turntable, rollers, and support in engagement when the screw means is released to facilitate the raising of the turntable from one of the index notches to permit the turntable to ride on the rollers to the next circumferentially spaced index notch.

2. In a means of the class described, a support, a turntable rotatably mounted on said support and provided with a face adjacent the support, said face being perpendicular to the rotating axis of the turntable on the support, a positioning roller means between the support and the turntable, said support having means for receiving the roller means therein, the face of the turntable being adapted to ride upon the roller means, and the face also being provided with a plurality of shallow recesses for receiving the roller means and permitting the turntable to drop thereover for locating the turntable circumferentially with respect to the support, means for raising the turntable free of the roller means and locking the turntable against rotation with respect to the support, and means for securing said turntable with respect to the support and against rotation of the former with the latter when the turntable rests on the roller means, and also for securing the turntable relative to the support when raised by the raising means.

3. In a means of the class described, a support having a bolt receiving slot, a tool post having a base adjustably mounted over the support, a bolt extending through the central portion of the tool post and through said slot for securing the tool post to the support, and stop pins mounted to slide vertically in the base and adapted to extend below the same to engage the opposite walls forming the slot, and adapted to be retracted into the base to permit free movement of the latter on the support.

4. In a tool holding means, a tool holder having spaced apart flanges, the face of one of the flanges adjacent the other flange having a groove, a rocker tool-supporting wedge positioned in said groove and having a face adapted to be variously inclined to the face of said flange of the holder, the face of the wedge having a longitudinal channel provided with corresponding steps at the opposite sides to form a plurality of grooves of various widths, one within the other, a stop adapted to be positioned in one of the grooves adjacent one end portion of the wedge, means on said other flange of the holder for securing the stop to one end portion of the wedge, and other means on said other flange of the holder for securing a tool in one of said grooves of the wedge adjacent the opposite end portion of the face of the wedge and against said stop.

5. In a means of the class described, a support, a turntable rotatably mounted on said support and provided with a face adjacent the support, a plurality of rollers positioned between the support and the turntable for supporting the latter over the former, means for raising the turntable and locking the turntable against rotation with respect to the support, and means for securing said turntable with respect to the support and against rotation of the former with the latter, when the turntable rests on the rollers, and also for securing the turntable to the support in said raised position.

6. In a means of the class described, a support, a turntable rotatably mounted on said support and provided with a face adjacent the support, said face being perpendicular to the rotating axis of the turntable on the support, a plurality of rollers between the support and the turntable, said support having means for retaining the rollers therein, a portion of the rollers extending above the support, the face of the turntable being adapted to ride upon the rollers and the face also being provided with a plurality of shallow recesses for receiving the rollers and permitting the turntable to drop over the rollers for locating the turntable circumferentially with respect to the support, means for raising the turntable free of the rollers, and locking the turntable against rotation with respect to the support, and means for securing said turntable with respect to the support and against rotation of the former with the latter, when the turntable rests on the rollers, and also for securing the turntable to the support in said raised position.

ALFRED R. OBERWEGNER.

REFERENCES CITED

The following references are of record in the file of this patent:

UNITED STATES PATENTS

| Number    | Name     | Date          |
|-----------|----------|---------------|
| 318,718   | Gibson   | May 26, 1885  |
| 462,160   | Pihl     | Oct. 27, 1891 |
| 890,838   | Brewer   | June 16, 1908 |
| 1,937,241 | Hartness | Oct. 19, 1909 |
| 1,040,484 | Zsan     | Oct. 8, 1912  |
| 1,636,167 | Bozsin   | July 19, 1927 |
| 1,748,348 | Hyatt    | Feb. 25, 1930 |
| 1,945,291 | Palmer   | Jan. 30, 1934 |
| 1,945,292 | Palmer   | Jan. 30, 1934 |
| 2,135,639 | Gorham   | Nov. 8, 1938  |
| 2,278,988 | Groene   | Apr. 7, 1942  |
| 2,344,509 | Guenther | Mar. 21, 1944 |

FOREIGN PATENTS

| Number  | Country | Date          |
|---------|---------|---------------|
| 852,279 | France  | Jan. 27, 1940 |